United States Patent
Kim et al.

(10) Patent No.: US 7,944,481 B2
(45) Date of Patent: May 17, 2011

(54) APPARATUS AND METHOD FOR PROCESSING 3D VIDEO SIGNAL

(75) Inventors: Tae-hee Kim, Suwon-si (KR); Pil-ho Yu, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 595 days.

(21) Appl. No.: 11/604,762

(22) Filed: Nov. 28, 2006

(65) Prior Publication Data

US 2007/0120972 A1     May 31, 2007

(30) Foreign Application Priority Data

Nov. 28, 2005 (KR) ......................... 10-2005-0114369

(51) Int. Cl.
    *H04N 5/228* (2006.01)
(52) U.S. Cl. ........... 348/222.1; 348/42; 348/43; 348/46; 348/49; 348/48; 348/50; 348/47
(58) Field of Classification Search ............... 348/222.1, 348/42–50
See application file for complete search history.

(56) References Cited

U.S. PATENT DOCUMENTS

| | | | |
|---|---|---|---|
| 6,111,596 A | 8/2000 | Haskell et al. | |
| 2004/0041905 A1* | 3/2004 | Shibayama | ..................... 348/47 |
| 2004/0062434 A1 | 4/2004 | Tsuyuki et al. | |

FOREIGN PATENT DOCUMENTS

| | | |
|---|---|---|
| EP | 0933646 A2 | 8/1999 |
| EP | 1081504 A2 | 3/2001 |
| EP | 1313328 A2 | 5/2003 |
| JP | 9-23451 A | 1/1997 |
| JP | 10-52402 A | 2/1998 |
| JP | 11-355808 A | 12/1999 |
| JP | 2001258052 | 9/2001 |
| KR | 1999-016853 A | 3/1999 |
| WO | 99/20056 A1 | 4/1999 |
| WO | 2004/049736 A1 | 6/2004 |
| WO | 2006/038744 A1 | 4/2006 |
| WO | 2006/062325 A1 | 6/2006 |
| WO | 2006/079963 A2 | 8/2006 |

OTHER PUBLICATIONS

Extended European Search Report issued Jun. 9, 2010, in counterpart European Application No. 06124763.1.

* cited by examiner

*Primary Examiner* — David L Ometz
*Assistant Examiner* — Antoinette T Spinks
(74) *Attorney, Agent, or Firm* — Sughrue Mion, PLLC

(57) ABSTRACT

Provided are an apparatus and method for processing a three-dimensional (3D) video signal which corrects first and second video signals to prevent a reduction in a 3D effect and a disparity estimation error due to a difference between the first and second video signals. The method includes: a video signal detection unit detecting a difference between respective characteristics of received first and second video signals; and a video signal correction unit correcting the first video signal or the second video signal to equalize the characteristics of the first and second video signals. When the apparatus and the method are used, a reduction in the 3D effect and the disparity estimation error due to the difference between the first and second video signals can be prevented.

35 Claims, 9 Drawing Sheets

FIG. 6

| | BRIGHTNESS | LOW | | HIGH |
|---|---|---|---|---|
| | CONTRAST | LOW | | HIGH |
| | HORIZONTAL POSITION | 50 | − | + |
| | VERTICAL POSITION | 50 | − | + |
| | PHASE | 14 | − | + |
| | FREQUENCY | 1664 | − | + |
| | SCALING | | | FILL ALL |

APPARATUS AND METHOD FOR PROCESSING 3D VIDEO SIGNAL

This application claims the priority of Korean Patent Application No. 10-2005-0114369, filed on Nov. 28, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to processing a three-dimensional (3D) video signal, and more particularly, to processing a 3D video signal in a manner that corrects first and second video signals to prevent a reduction in a 3D effect and a disparity estimation error due to a difference between the first and second video signals.

2. Description of the Related Art

Most 3D videos and 3D display devices utilize a binocular disparity. To obtain a real video, a stereo camera having two incident lenses is used. In the case of 3D computer graphics (CG), two or more virtual cameras are used to obtain videos in the same way that a real video is obtained using a real camera, and videos output from the respective virtual cameras are synthesized to make the videos suitable for a display device.

However, when a difference between first and second video signals exceeds a predetermined threshold, binocular fusion is not established. As a result, a double image is observed. Therefore, stereoscopic videos cannot be provided to users, and eyestrain is caused.

In addition, when eyestrain is reduced by correcting a disparity between objects within a video and correcting the perception of depth of the objects, a disparity estimation error may occur due to the difference between the first and second video signals. In other words, when a block-based disparity estimation method is used to estimate the disparity between the first and second video signals to correct the disparity therebetween, an estimation error occurs in the process of estimating the disparity between the first and second video signals in a part adjacent to an edge of an image of the video.

More specifically, in the block-based disparity estimation method, a first image is divided into N×N blocks and a block most similar to each of the blocks within the first image is estimated in a second image using a sum of absolute difference (SAD) or a mean of absolute difference (MAD). However, when there is, for example, a brightness difference between the first and second video signals, an error occurs when the block most similar to each of the blocks in the first image is estimated in the second image.

SUMMARY OF THE INVENTION

An aspect of the present invention provides an apparatus and method for processing a three-dimensional (3D) video signal, which corrects first and second video signals to prevent a reduction in a 3D effect and a disparity estimation error due to a difference between the first and second video signals.

An aspect of the present invention also provides an apparatus and method for processing a 3D video signal, which enables users to adjust correction levels of first and second video signals such that an optimal 3D effect for users can be provided.

According to an aspect of the present invention, there is provided an apparatus for processing a three-dimensional (3D) video signal, the apparatus including: a video signal detection unit detecting differences between respective characteristics of received first and second video signals; and a video signal correction unit correcting the first video signal or the second video signal to equalize the characteristics of the first and second video signals.

The differences between the characteristics of the first and second video signals may include differences in at least one of contrast, color, brightness, magnification, definition, and geometric distortion between the first and second video signals.

The apparatus may further include a video synthesizing unit synthesizing the corrected first and second video signals and outputting a 3D video.

The apparatus may further include a disparity estimation & adjustment unit estimating a disparity between the first and second video signals using the corrected first video signal or the corrected second video signal and adjusting the estimated disparity.

The video signal correction unit may correct the second video signal based on the characteristics of the first video signal or correct the first video signal based on the characteristics of the second video signal, or correct the first and second video signals based on an average of the characteristics of the first and second video signals to equalize the detected characteristics of the first and second video signals.

The video signal detection unit may generate a histogram of contrast, which is one of the characteristics of the first and second video signals, for each frame of each of the first and second video signals and detect a contrast difference between the first and second video signals based on distribution of the generated contrast histogram.

The video signal correction unit may correct a bright portion to become brighter and correct a dark portion to become darker, of whichever of the first video signal or the second video signal has a lower contrast level, to equalize contrast levels of the first and second video signals.

The video signal detection unit may average respective values of brightness for each frame of each of the first and second video signals and detect a brightness difference between the first and second video signals using each of the calculated averages.

The video signal correction unit may equalize brightness levels of the first and second video signals by increasing an overall brightness level of whichever of the first and the second video signals has a lower brightness level.

The video signal detection unit may generate a histogram of color for each frame of each of the first and second video signals and detect a color difference between the first and second video signals based on the distribution of the generated color histogram.

When receiving a broadcasting signal that includes the first and second video signals, the video signal correction unit may compare test patterns of the first and second video signals and correct the first and second video signals to equalize the test patterns thereof.

The video signal correction unit may generate the test patterns of the first and second video signals and correct the first and second video signals to equalize the test patterns of the first and second video signals.

When further receiving camera parameters for the characteristics of the first and second video signals at the time of a photographing operation, the video signal correction unit may correct the first and second video signals based on the camera parameters.

The apparatus may further include a video signal evaluation unit that calculates a degree of fatigue using the differences between the characteristics of the first and second video signals detected by the video signal detection unit, compares the calculated degree of fatigue with a predetermined fatigue threshold, and determines whether to correct the first and second video signals based on the comparison result, wherein the video signal correction unit corrects the first or second video signal to equalize the characteristics of the first and second video signals based on the determination result.

When the video signal detection unit detects the contrast difference between the first and second video signals and the video signal evaluation unit compares the contrast difference between the first and second video signals with a predetermined contrast difference threshold and determines that the contrast difference is greater than the predetermined contrast difference threshold, the video signal correction unit may correct the first or second video signal based on the determination result to equalize the contrast levels of the first and second video signals.

When the video signal detection unit detects the brightness difference between the first and second video signals and the video signal evaluation unit compares the brightness difference between the first and second video signals with a predetermined brightness difference threshold and determines that the brightness difference is greater than the predetermined brightness difference threshold, the video signal correction unit may correct the first or second video signal based on the determination result to equalize the brightness levels of the first and second video signals.

The apparatus may further include an on-screen display (OSD) control unit providing a user with a correction level indicating a range of correction level values to receive the correction level values for the characteristics of video signals from the user, wherein the video signal correction unit corrects the first and second video signals based on the correction level values received from the user.

The apparatus may further include an on-screen graphic (OSG) provision unit providing the correction level received from the OSD control unit in the form of characters and/or graphics.

According to another aspect of the present invention, there is provided a method of processing a 3D video signal, the method including: detecting differences between respective characteristics of received first and second video signals; and correcting the first video signal or the second video signal to equalize the characteristics of the first and second video signals.

BRIEF DESCRIPTION OF THE DRAWINGS

The above and other features and advantages of the present invention will become more apparent by describing in detail exemplary embodiments thereof with reference to the attached drawings in which:

FIG. 6 illustrates a display screen providing an on-screen graphics function according to an embodiment of the present invention;

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
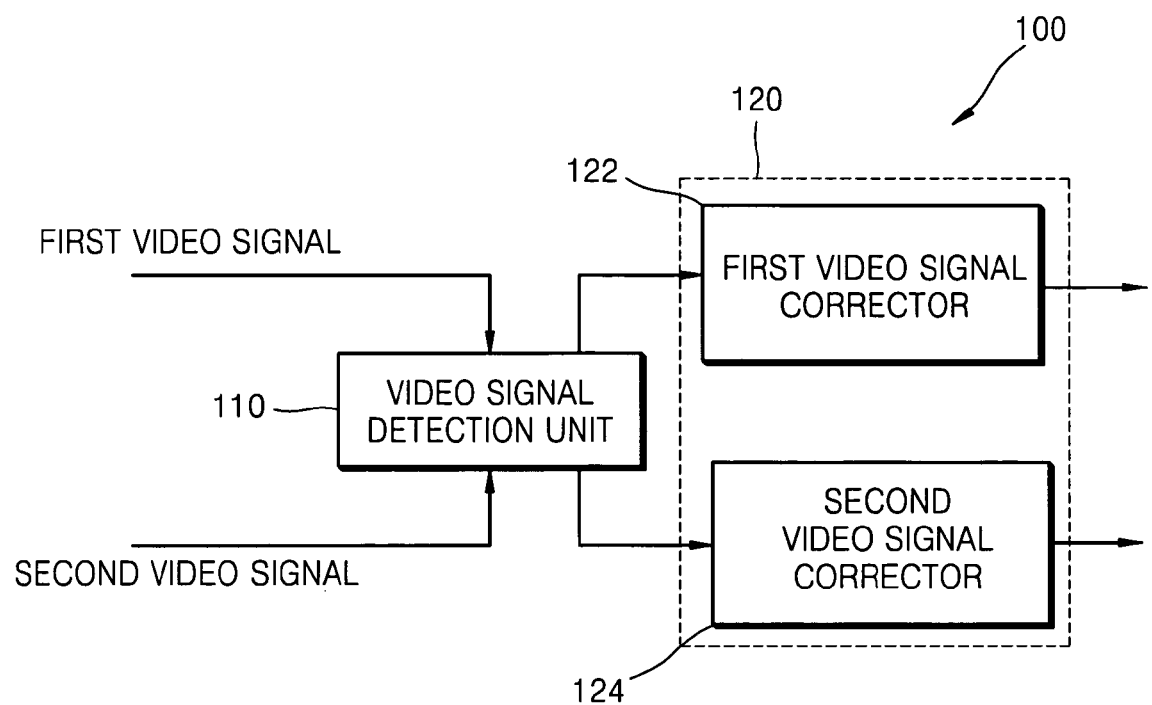
FIG. 1 is a block diagram of an apparatus for processing a three-dimensional (3D) video signal according to an embodiment of the present invention.

FIG. 1 is a block diagram of an apparatus 100 for processing a three-dimensional (3D) video signal according to an embodiment of the present invention.

Referring to FIG. 1, the apparatus 100 includes a video signal detection unit 110 and a video signal correction unit 120. The apparatus 100 receives a first video signal and a second video signal and corrects the first and second video signals to equalize respective characteristics thereof. In an exemplary case, the characteristics of the first and second video signals include contrast, color, brightness, magnification, definition, and geometric distortion.

The video signal detection unit 110 receives the first and second video signals and detects differences between the characteristics of the first and second video signals. The video signal correction unit 120 corrects the first and second signals to equalize the characteristics thereof.

The video signal correction unit 120 includes a first video signal corrector 122 and a second video signal corrector 124 which respectively correct the first and second video signals. The video signal correction unit 120 can correct the first and second video signals to equalize the characteristics thereof based on the detected difference between the first and second video signals.

In other words, the second video signal corrector 124 of the video signal correction unit 120 can correct the characteristics of the second video signal based on the characteristics of the first video signal, and the first video signal corrector 122 of the video signal correction unit 120 can correct the characteristics of the first video signal based on the characteristics of the second video signal. Alternatively, the video signal correction unit 120 may average the characteristics of the first and second video signals and correct the characteristics of the first and second video signals based on the average characteristics. The first video signal corrector 122 and the second video signal corrector 124 included in the video signal correction unit 120 may communicate with each other to perform the above functions. Alternatively, one of the first and second video signal correctors 122 and 124 may control the overall operation of the video signal correction unit 120.

Figure 3:
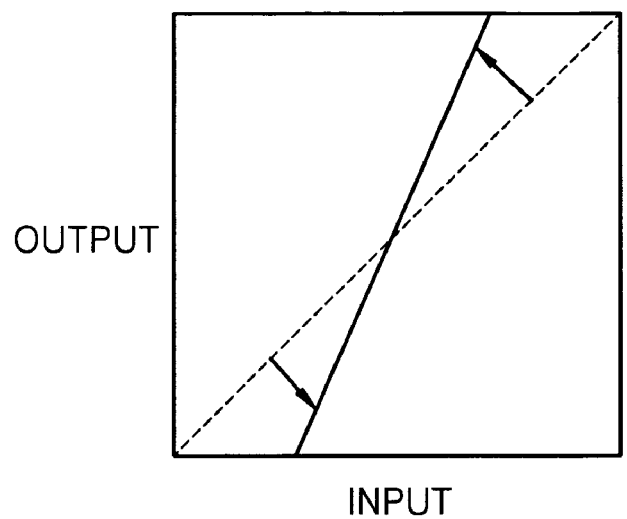
FIG. 3 is a diagram for illustrating a method of correcting a contrast difference according to an embodiment of the present invention.

A method of correcting contrast, which is one of the characteristics of the first and second video signals, using the apparatus 100 will now be described with reference to FIG. 3. FIG. 3 is a diagram for illustrating a method of correcting a contrast difference according to an embodiment of the present invention.

The video signal detection unit 110 generates a histogram of contrast for each frame of each of the first and second video signals and detects contrast levels of the first and second video signals and the contrast difference between the first and second video signals based on the distribution of the generated histogram. Alternatively, the video signal detection unit 110 may detect a maximum or minimum contrast level of each frame of each of the first and second video signals as a contrast level value and detect the difference between the contrast level values.

As illustrated in FIG. 3, the video signal correction unit 120 corrects the first video signal or the second video signal, whichever has a lower contrast level, to the contrast level of the first video signal or the second video signal, whichever has a higher contrast level, thereby equalizing the contrast levels of the first and second video signals. When the contrast level of the first video signal is lower, the first video signal corrector 122 may correct a bright portion of the first video signal to become brighter and a dark portion of the first video signal to become darker, thereby increasing the contrast level of the first video signal. When the contrast level of the second video signal is lower, the second video signal corrector 124 may correct a portion of the second video signal to become brighter and a dark portion of the second video signal to become darker, thereby increasing the contrast level of the second video signal.

Figure 4:
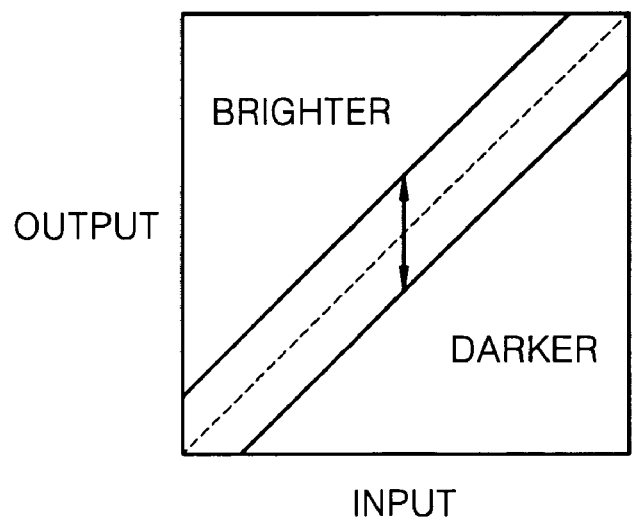
FIG. 4 is a diagram for illustrating a method of correcting a brightness difference according to an embodiment of the present invention.

A method of correcting brightness, which is one of the characteristics of the first and second video signals, using the apparatus 100 will now be described with reference to FIG. 4. FIG. 4 is a diagram for illustrating a method of correcting a brightness difference according to an embodiment of the present invention.

The video signal detection unit 10 averages respective brightness values of the first and second video signals for each frame, differentiates the calculated averages, and detects the brightness difference between the first and second video signals. Then, as illustrated in FIG. 4, the video signal correction unit 120 corrects the brightness level of the first or second video signal, thereby equalizing the brightness levels of the first and second video signals.

In addition, the video signal detection unit 110 generates a histogram of color (R, G and B) for each of the first and second video signals for each frame and detects color levels of the first and second video signals and the color difference between the first and second video signals based on the distribution of the generated histogram. Alternatively, the video signal detection unit 110 may detect the color difference between frames of each of the first video signal and the second video signal.

The video signal correction unit 120 may then correct the color level of the first video signal and/or the second video signal based on the color difference between the first video signal and the second video signal detected by the video signal detection unit 110. Alternatively, the video signal correction unit 120 may correct the color levels of the first and second video signals based on an average of color levels of the first and second video signals.

A method of correcting first and second video signals using the video signal correction unit 120 based on the detected characteristics of the first video signal and/or the second video signal according to an embodiment of the present invention has been described above. The video signal correction unit 120 may correct the first and second video signals using a test pattern. For example, when receiving a broadcasting signal that includes first and second video signals, the video signal correction unit 120 compares test patterns of the first and second video signals and corrects the first and second video signals to equalize the test patterns thereof. Alternatively, when the video signal correction unit 120 includes a test pattern generation circuit (not shown), the test pattern generation circuit may receive the first and second video signals, generate test patterns of the same, and correct the first and second video signals to equalize the test patterns of the first and second video signals.

When also receiving camera parameters for the characteristics of the first and second video signals at the time of a photographing operation, the video signal correction unit 120 may correct the first and second video signals based on the camera parameters. As described above, the characteristics of the first and second video signals can be corrected using various methods.

A method of receiving two video signals, that is, first and second video signals, and correcting the first and second video signals such that characteristics of the first and second video signals can be equalized has been described with reference to FIG. 1, according to an embodiment of the present invention. However, the present invention is not limited to two video signals, and three or more video signals can be received. Even when receiving three or more video signals, the video signal correction unit 120 may correct the received three or more video signals such that the difference between the three or more video signals is eliminated and characteristics of the three or more video signals are equalized.

Figure 2:
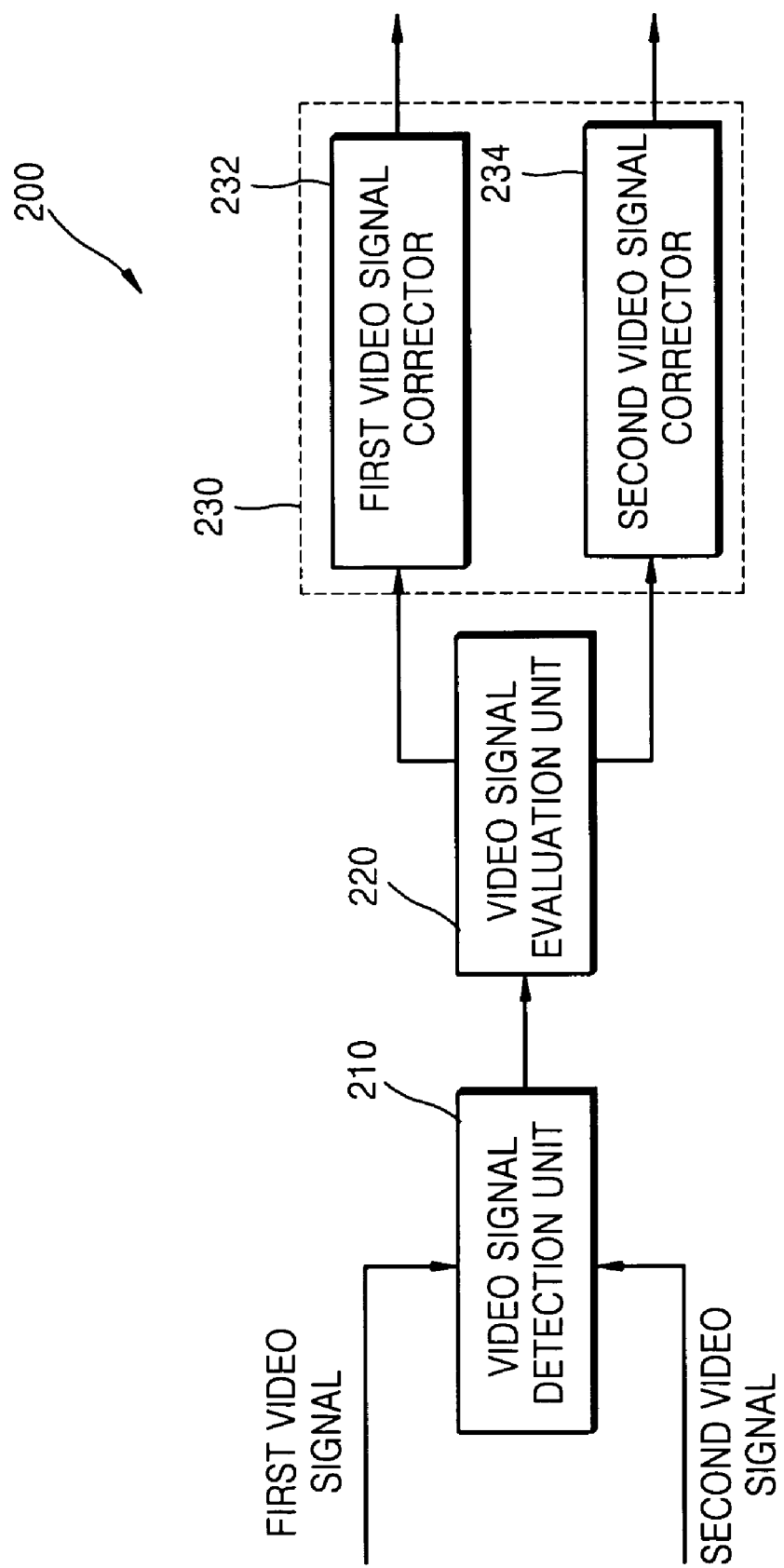
FIG. 2 is a block diagram of an apparatus for processing a 3D video signal according to another embodiment of the present invention.

FIG. 2 is a block diagram of an apparatus 200 for processing a 3D video signal according to another embodiment of the present invention. Referring to FIG. 2, the apparatus 200 includes a video signal evaluation unit 220. When the apparatus 200 is compared with the apparatus 100 of FIG. 1, the apparatus 200 further includes a video signal detection unit 210 and a video signal correction unit 230. When the difference between a first video signal and a second video signal exceeds a predetermined threshold, the apparatus 200 corrects the first and second video signals. A predetermined fatigue threshold may be a fixed value experimentally determined and stored in advance according to characteristics of the apparatus 200, a modifiable value, or a user adjustable value input through a user interface.

A video signal detection unit 210 included in the apparatus 200 detects differences between characteristics of the first and second video signals. The video signal evaluation unit 220 receives the differences from the video signal detection unit 210 as an input value and calculates a degree of fatigue using a function of fatigue. The function of fatigue can be defined as:

$$\text{Function (degree of fatigue)} = \alpha \times \text{contrast difference} + \beta \times \text{brightness difference} + \ldots + \gamma \times \text{magnification difference} \quad (1)$$

In other words, the video signal evaluation unit 200 calculates the degree of fatigue by multiplying differences between the first and second video signals by predetermined coefficients, respectively, and adding values obtained after the multiplication. Then, the video signal evaluation unit 200 compares the calculated degree of fatigue with a predetermined fatigue threshold, for example, "a" and determines whether to correct the first and second video signals. The video signal correction unit 230 corrects the first and second video signals based on the determination of the video signal evaluation unit 220 such that the characteristics of the first and second video signals can be equalized.

Like the video signal correction unit 120 illustrated in FIG. 1, the video signal correction unit 230 may correct the first and second video signals by comparing the characteristics or test patterns of the first and second video signals or using camera parameters such that the characteristics of the first and second video signals can be equalized. The operation of the apparatus 200 correcting the differences in contrast and brightness between the first and second video signals is described as follows.

When the video signal detection unit 210 detects the contrast difference between the first video signal and the second video signal and inputs information regarding the contrast difference to the video signal evaluation unit 220, the video signal evaluation unit 220 compares the detected contrast difference with a predetermined contrast difference threshold, for example, "b." If the video signal evaluation unit 220 determines that the detected contrast difference exceeds the predetermined contrast difference threshold, the video signal correction unit 230 corrects the first and second video signals such that the contrast levels of the first and second video signals can be equalized.

Meanwhile, the video signal detection unit 210 detects a brightness difference between the first video signal and the second video signal and inputs information regarding the brightness difference to the video signal evaluation unit 220, and the video signal evaluation unit 220 compares the detected brightness difference with a predetermined brightness difference threshold, for example, "c." If the video signal evaluation unit 220 determines that the detected brightness difference exceeds the predetermined brightness difference threshold, the video signal correction unit 230 corrects the first and second video signals such that the brightness levels of the first and second video signals can be equalized.

The predetermined contrast difference threshold "b" and the predetermined brightness difference threshold "c" may be fixed values experimentally determined and stored in advance according to the characteristics of the apparatus 200, modifiable values, or user adjustable values input through a user interface.

Figure 5:
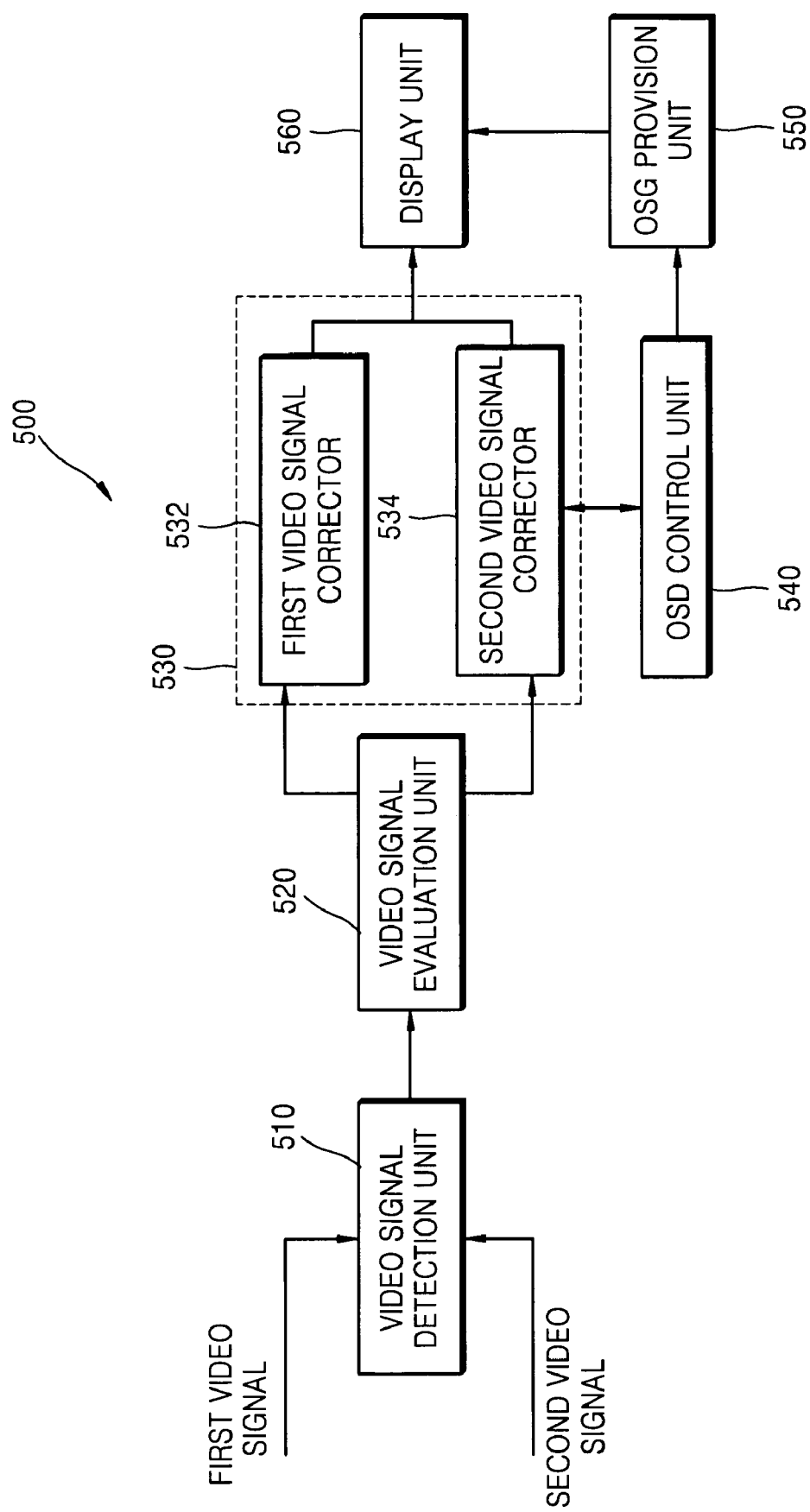
FIG. 5 is a block diagram of an apparatus for processing a 3D video signal, which corrects a 3D video signal using a user interface according to an embodiment of the present invention.

FIG. 5 is a block diagram of an apparatus 500 for processing a 3D video signal, which corrects a 3D video signal using a user interface according to an embodiment of the present invention. Referring to FIG. 5, the apparatus 500 receives from a user a correction level value to be reflected when correcting first and second video signals and displays a 3D video desired by the user. To this end, the apparatus 500 includes a video signal detection unit 510, a video signal evaluation unit 520, a video signal correction unit 530, an on-screen display (OSD) control unit 540, an on-screen graphic (OSG) provision unit 550, and a display unit 560.

The OSD control unit 540 provides a user with a correction level indicating the range of correction level values for characteristics of video signals and receives correction level values from the user. The OSG provision unit 550 provides a correction level received from the OSD control unit 540 in the form of characters and/or graphics so that the user can recognize the correction level.

FIG. 6 illustrates a display screen providing an on-screen graphics function according to an embodiment of the present invention. Referring to FIG. 6, the OSG provision unit 550 provides correction levels for brightness and contrast. However, controlled by the OSD control unit 540, the OSG provision unit 550 can also provide correction levels for other characteristics, such as color, definition, geometric distortion, and magnification, of a video in the form of graphics.

The operation of the apparatus 500 will now be described. The video signal detection unit 510 detects differences between the characteristics of the first and second video signals. Then, the video signal evaluation unit 520 calculates a degree of fatigue using the differences of video signal detected by the video signal detection unit 510, compares the calculated degree of fatigue with a predetermined fatigue threshold, and determines whether to correct the first and second video signals.

When the video signal evaluation unit 520 determines that the calculated degree of fatigue exceeds the predetermined fatigue threshold, the OSD control unit 550 controls the OSG provision unit 560 to provide a message which contains information regarding the need for correcting the first and second video signals and a correction level which indicates the range of correction level values.

The OSD control unit 540 then identifies whether correction level values for video characteristics have been input by a user. When a user inputs correction level values for various video characteristics to the OSD control unit 540, the OSD control unit 540 transmits the received correction level values to the video signal correction unit 530. Accordingly, the video signal correction unit 530 corrects the first and second video signals based on the received correction level values. When the user does not input the correction level values, the first and second video signals can be corrected according to various embodiments of the present invention described above with reference to FIGS. 1 and 2 such that the characteristics of the first and second video signals can be equalized.

Figure 7:
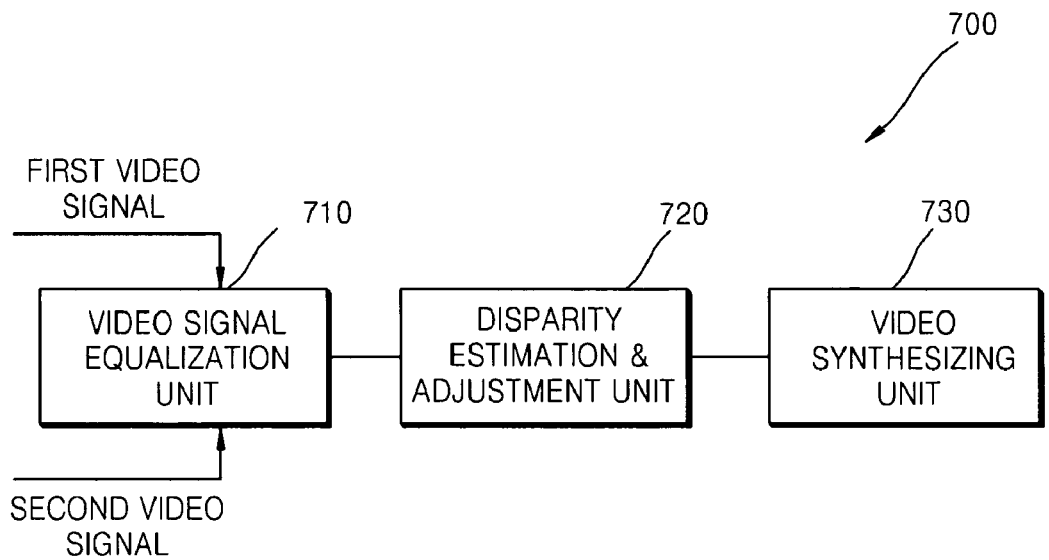
FIG. 7 is a block diagram of an apparatus for processing a 3D video signal according to another embodiment of the present invention.

FIG. 7 is a block diagram of an apparatus 700 for processing a 3D video signal according to another embodiment of the present invention. Referring to FIG. 7, the apparatus 700 includes a video signal equalization unit 710, a disparity estimation & adjustment unit 720, and a video synthesizing unit 730. The video signal equalization unit 710 may include the apparatus 100 of FIG. 1 or the apparatus 200 of FIG. 2 for processing a 3D video signal or the apparatus 500 of FIG. 5 without the display unit 560.

According to various embodiments of the present invention described above, the video signal equalization unit 710 corrects received first and second video signals to equalize characteristics thereof. The disparity estimation & adjustment unit 720 estimates a disparity between the first and second video signals using the corrected first and second video signals and adjusts the estimated disparity. The video synthesizing unit 730 synthesizes the first and second video signals having the adjusted disparity and outputs a 3D video.

In this way, the apparatus 700 can correct the first and second video signals to equalize the characteristics thereof. Consequently, the apparatus 700 can estimate and correct a disparity between the first and second video signals. Therefore, estimation errors that may occur during a disparity estimation process can be reduced, thereby enhancing the 3D effect of a displayed 3D video and reducing eyestrain.

Figure 8:
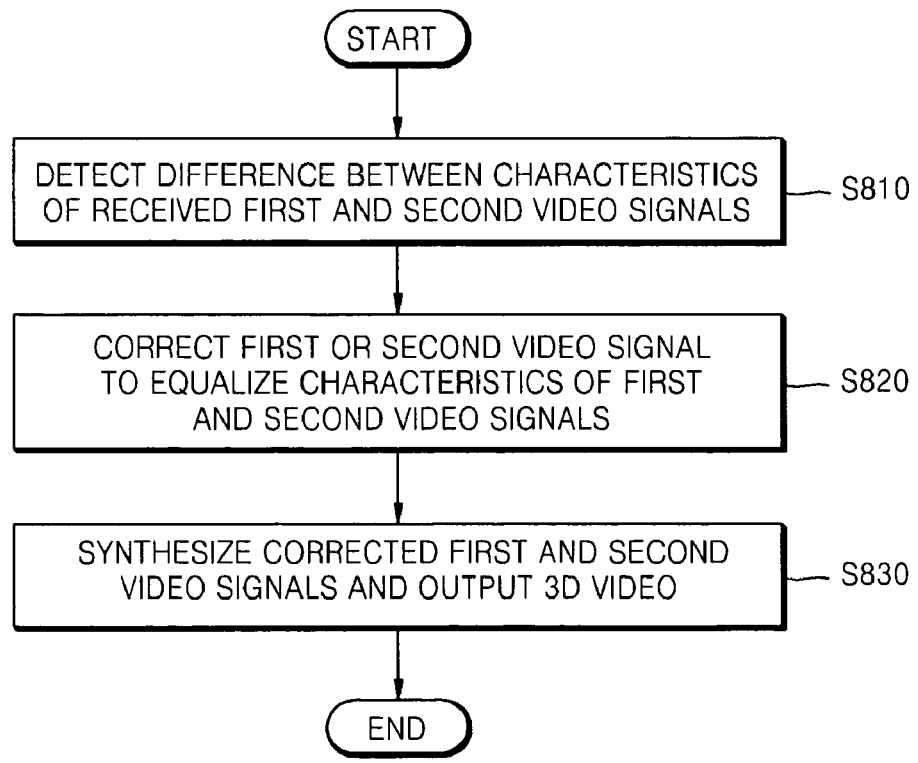
FIG. 8 is a flowchart illustrating a method of processing a 3D video signal according to an embodiment of the present invention.

FIG. 8 is a flowchart illustrating a method of processing a 3D video signal according to an embodiment of the present invention. Referring to FIG. 8, differences between characteristics of received first and second video signals are detected (operation S810). In an exemplary case, the differences may include differences in at least one of contrast, color, brightness, magnification, definition, and geometric distortion between the first and second video signals. The first and second signals are corrected to equalize the characteristics thereof (operation S820).

The corrected first and second video signals are synthesized and a 3D video is output as a result (operation S830). The method may further include an operation of estimating a disparity between the first video signal and the second video signal using the corrected first and second video signals and correcting the estimated disparity between operation S820 and operation S830. In this case, the corrected first and second video signals can be synthesized based on the disparity corrected in operation S830 and a 3D video can be output as a result.

Figure 9:
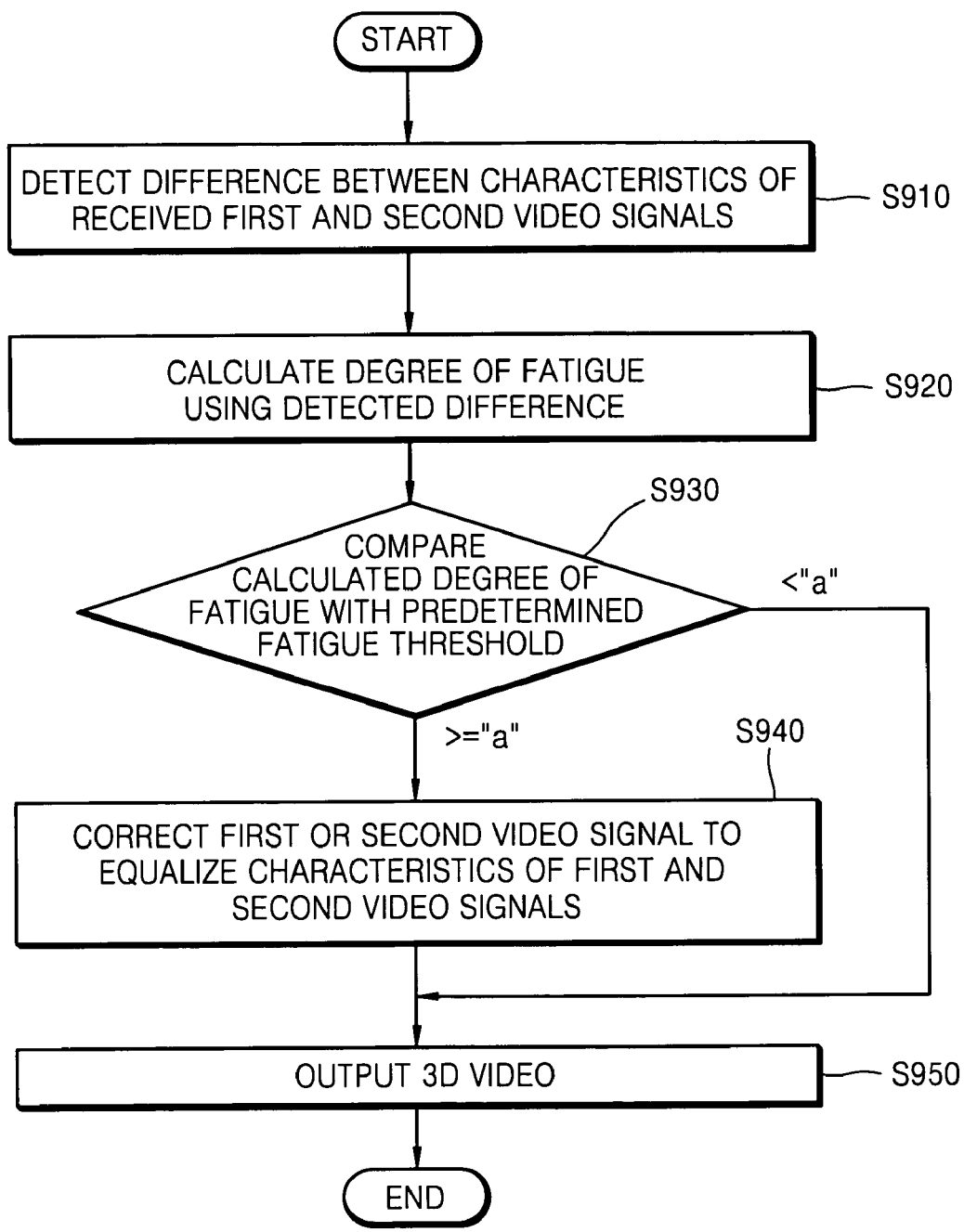
FIG. 9 is a flowchart illustrating a method of processing a 3D video signal according to another embodiment of the present invention

FIG. 9 is a flowchart illustrating a method of processing a 3D video signal according to another embodiment of the present invention. Referring to FIG. 9, differences between characteristics of received first and second video signals are detected (operation S910). A degree of fatigue is calculated using the detected differences (operation S920). The degree of fatigue may be calculated using a function of fatigue like Equation 1. The calculated degree of fatigue is compared with a predetermined fatigue threshold, for example, "a" and it is determined whether to correct the first and second video signals based on the comparison result (operation S930). When the calculated degree of fatigue is smaller than the predetermined fatigue threshold "a," the received first and second video signals are synthesized and a 3D video is output as a result (operation S950). When the calculated degree of fatigue is greater than or equal to the predetermined fatigue limit "a," the first and second video signals are corrected to equalize the characteristics of the first and second video signals (operation S940). Then, the corrected first and second video signals are synthesized and a 3D video is output as a result (operation S950).

Figure 10:
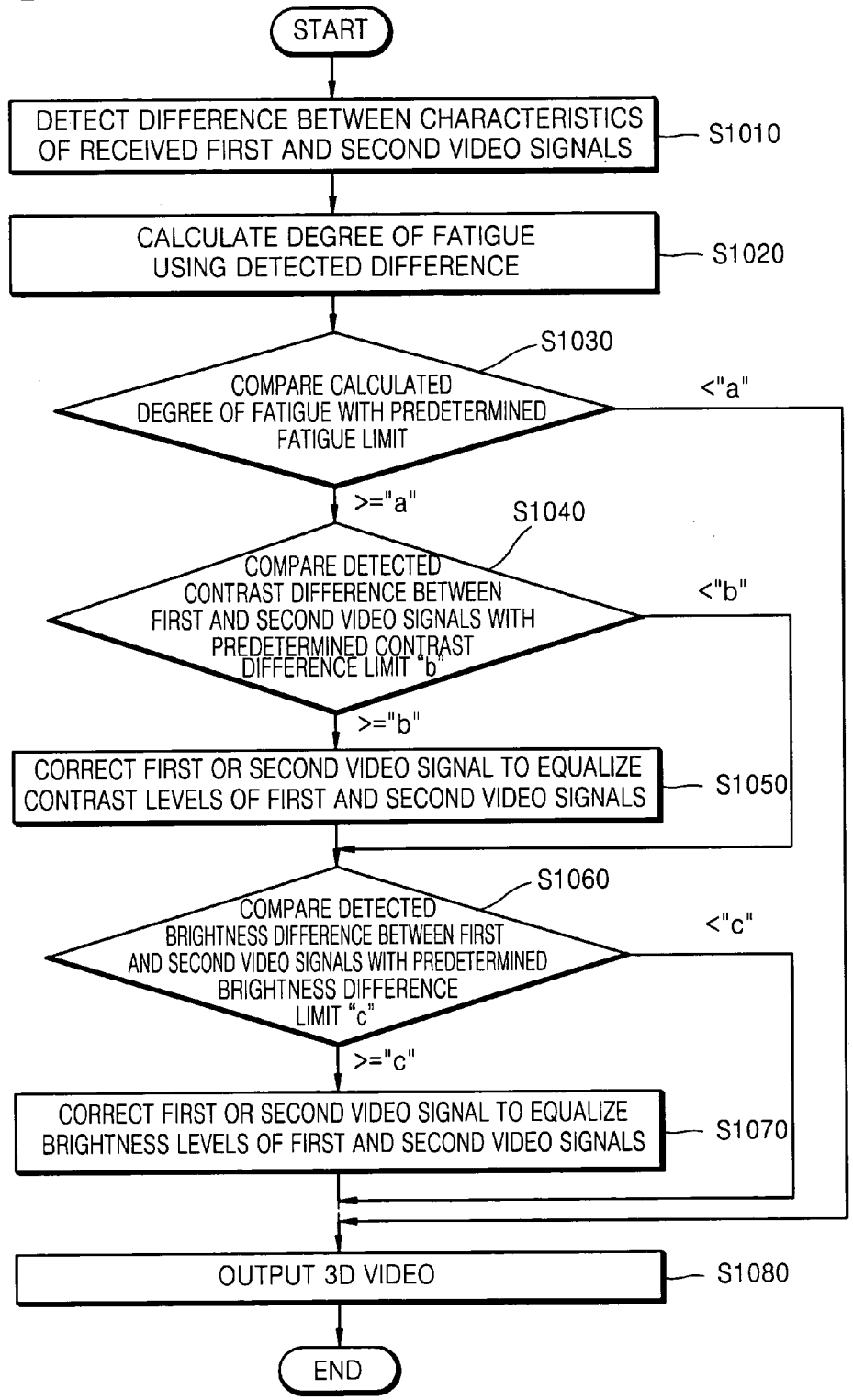
FIG. 10 is a detailed flowchart illustrating the method of FIG. 9.

FIG. 10 is a detailed flowchart illustrating the method of FIG. 9. FIG. 10 illustrates operation S940 of the method of FIG. 9, in which the first and second video signals are corrected, in more detail. Referring to FIG. 10, the differences between the characteristics of the received first and second video signals are detected (operation S1010). The degree of fatigue is calculated using the detected differences (operation S1020). The calculated degree of fatigue is compared with a predetermined fatigue threshold, for example, "a" and it is determined whether to correct the first and second video signals based on the comparison result (operation S1030). When the calculated degree of fatigue is smaller than the predetermined fatigue threshold "a," the received first and second video signals are synthesized without correction and a 3D video is output as a result (operation S1080).

When the calculated degree of fatigue is greater than or equal to the predetermined fatigue threshold "a," the difference in contrast, which is one of the detected characteristics of the first and second video signals, of the first and second video signals is compared with a predetermined contrast difference threshold, for example, "b" (operation S1040). When the detected contrast difference is greater than or equal to the predetermined contrast difference threshold, "b," the first and second video signals are corrected such that the contrast levels of the first and second video signals can be equalized (operation S1050).

When the detected contrast difference is smaller than the predetermined contrast difference threshold, "b," the difference in brightness, which is one of the detected characteristics of the first and second video signals, of the first and second video signals is compared with a predetermined brightness difference threshold, for example, "c" (operation S1060). When the detected brightness difference is equal to or exceeds the predetermined brightness difference threshold "c," the first and second video signals are corrected such that the brightness levels of the first and second video signals can be equalized (operation S1070).

In FIG. 10, operations of correcting the contrast and brightness of the first and second video signals are illustrated. However, after operation S1070, the first and second video signals may be corrected such that other characteristics, such as color, definition, geometric distortion and magnification, of the first and second video signals can be equalized.

Figure 11:
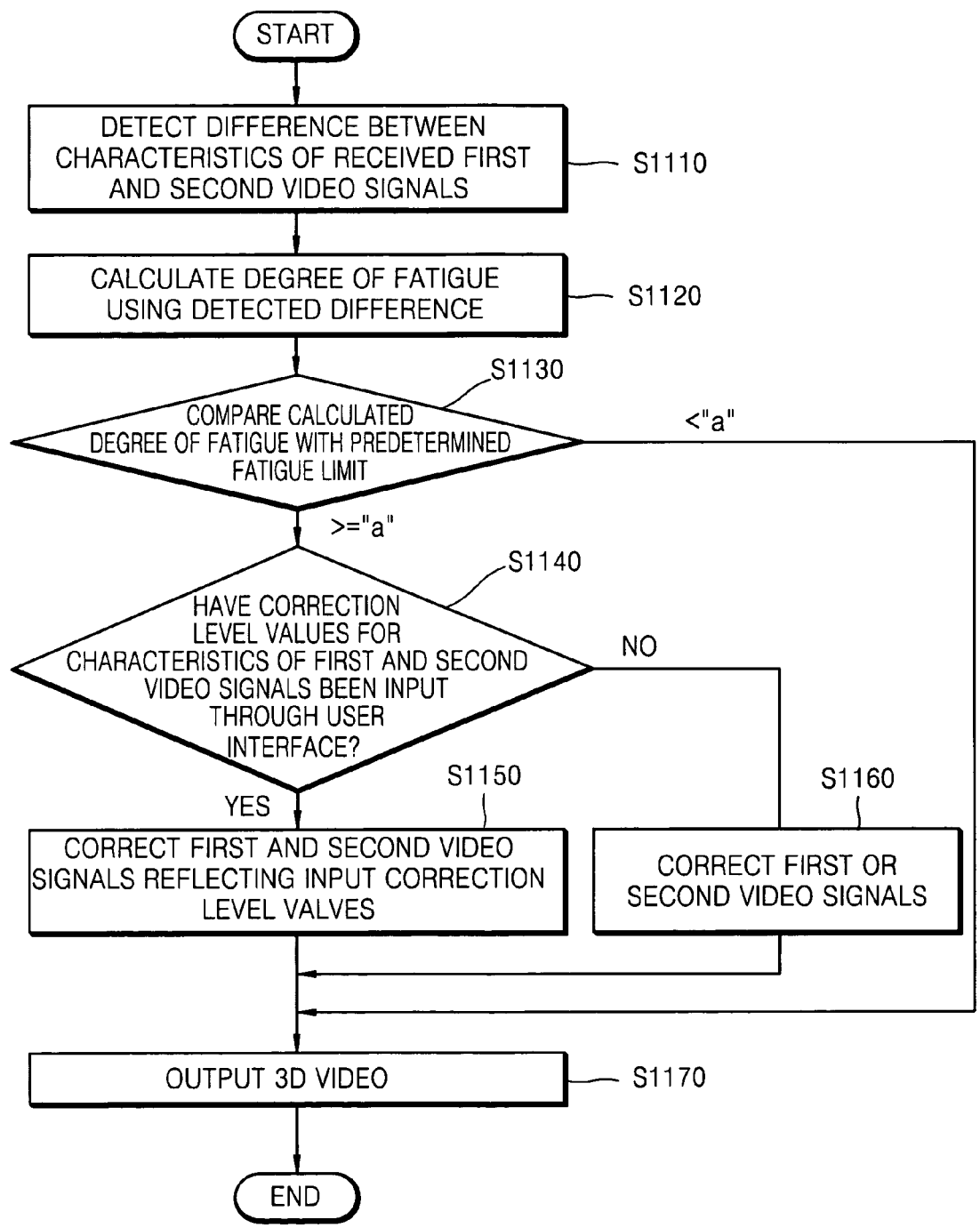
FIG. 11 is a flowchart illustrating a method of correcting a 3D video signal according to another embodiment of the present invention.

FIG. 11 is a flowchart illustrating a method of correcting a 3D video signal according to another embodiment of the present invention. Referring to FIG. 1, differences between characteristics of received first and second video signals are detected (operation S1110). A degree of fatigue is calculated using the detected differences (operation S1120). The calculated degree of fatigue is compared with a predetermined fatigue threshold, for example, "a" and it is determined whether to correct the first and second video signals based on the comparison result (operation S1130). When the calculated degree of fatigue is greater than or equal to the predetermined fatigue threshold "a," it is identified whether a correction level value for a characteristic of the first and second video signals has been input by a user through a user interface (operation S1140).

When the user has input the correction level value, the first and second video signals are corrected based on the received correction level value (operation S1150). When the user has not input the correction level value, the first and second video signals are corrected according to the various embodiments of the present invention described above (operation S1160). When the first and second video signals are corrected to equalize the characteristics thereof, the first and second video signals are synthesized and a 3D video is output as a result (operation S1170).

As described above, an aspect of the present invention can correct first and second video signals to prevent a reduction in a 3D effect and a disparity estimation error due to differences between the first and second video signals.

An aspect of the present invention also provides an apparatus and method for processing a 3D video signal, which enables users to adjust correction levels of the first and second video signals such that an optimal 3D effect for users can be provided.

The apparatus for processing a 3D video signal according to an embodiment of the present invention can be used not only in a stereo video reproducing apparatus but also in a multi-view video reproducing apparatus. Thus, a 3D video can be efficiently provided to users.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for processing a three-dimensional (3D) video signal, the apparatus comprising:
 a video signal detection unit which detects differences between respective characteristics of received first and second video signals
 a video signal evaluation unit which calculates a degree of difference between the first and second video signals by multiplying the differences between the characteristics of the first and second video signals by predetermined coefficients and adding values obtained after the multiplication, and determines whether the calculated degree of difference is greater than or equal to a predetermined difference threshold; and
 a video signal correction unit which corrects at least one of the first video signal and the second video signal to equalize the characteristics of the first and second video signals based on the determination result.

2. The apparatus of claim 1, wherein the differences between the characteristics of the first and second video signals comprise differences in at least one of contrast, color, brightness, magnification, definition, and geometric distortion between the first and second video signals.

3. The apparatus of claim 1, further comprising a video synthesizing unit which synthesizes the corrected at least one of the first video signal and the second video signal and outputs a 3D video.

4. The apparatus of claim 1, further comprising a disparity estimation & adjustment unit which estimates a disparity between the first and second video signals using the corrected at least one of the first video signal and the second video signal and adjusts the estimated disparity.

5. The apparatus of claim 1, wherein the video signal correction unit corrects the second video signal based on the characteristics of the first video signal or corrects the first video signal based on the characteristics of the second video signal, or corrects the first and second video signals based on an average of the characteristics of the first and second video signals to equalize the detected characteristics of the first and second video signals.

6. The apparatus of claim 1, wherein the video signal detection unit generates a histogram of contrast, which is one of the characteristics of the first and second video signals, for each frame of each of the first and second video signals and detects a contrast difference between the first and second video signals based on distribution of the generated contrast histogram.

7. The apparatus of claim 5, wherein the video signal correction unit corrects a bright portion to become brighter and corrects a dark portion to become darker, of whichever of the first video signal or the second video signal has a lower contrast level, to equalize contrast levels of the first and second video signals.

8. The apparatus of claim 1, wherein the video signal detection unit averages respective values of brightness for each frame of each of the first and second video signals and detects a brightness difference between the first and second video signals using each of the calculated averages.

9. The apparatus of claim 8, wherein the video signal correction unit equalizes brightness levels of the first and second video signals by increasing an overall brightness level of whichever of the first and the second video signals has a lower brightness level.

10. The apparatus of claim 1, wherein the video signal detection unit generates a histogram of color for each frame of each of the first and second video signals and detects a color difference between the first and second video signals based on the distribution of the generated color histogram.

11. The apparatus of claim 1, wherein, when receiving a broadcasting signal that comprises the first and second video signals, the video signal correction unit compares test patterns of the first and second video signals and corrects at least one of the first and second video signals to equalize the test patterns thereof.

12. The apparatus of claim 1, wherein the video signal correction unit generates test patterns of the first and second video signals and corrects at least one of the first and second video signals to equalize the generated test patterns of the first and second video signals.

13. The apparatus of claim 1, wherein, when further receiving camera parameters for the characteristics of the first and second video signals at the time of a photographing operation, the video signal correction unit corrects at least one of the first and second video signals based on the camera parameters.

14. The apparatus of claim 1, wherein, when the video signal detection unit detects the contrast difference between the first and second video signals and the video signal evaluation unit compares the contrast difference between the first and second video signals with a predetermined contrast difference threshold and determines that the contrast difference is greater than the predetermined contrast difference threshold, the video signal correction unit corrects at least one of the first and second video signals based on the determination result to equalize the contrast levels of the first and second video signals.

15. The apparatus of claim 1, wherein, when the video signal detection unit detects the brightness difference between the first and second video signals and the video signal evaluation unit compares the brightness difference between the first and second video signals with a predetermined brightness difference threshold and determines that the brightness difference is greater than the predetermined brightness difference threshold, the video signal correction unit corrects at least one of the first or second video signals based on the determination result to equalize the brightness levels of the first and second video signals.

16. The apparatus of claim 1, further comprising an on-screen display (OSD) control unit providing a user with a correction level indicating a range of correction level values to receive the correction level values for the characteristics of video signals from the user, wherein the video signal correction unit corrects at least one of the first and second video signals based on the correction level values received from the user.

17. The apparatus of claim 16, further comprising an on-screen graphic (OSG) provision unit providing the correction level received from the OSD control unit in the form of characters and/or graphics.

18. A method of processing a 3D video signal, the method comprising:
 detecting differences between respective characteristics of received first and second video signals;
 calculating a degree of difference between the first and second video signals by multiplying the differences between the characteristics of the first and second video signals by predetermined coefficients and adding values obtained after the multiplication, and adding values obtained after the multiplication;
 determining whether the calculated degree of difference is greater than or equal to a predetermined difference threshold; and correcting at least one of the first video signal and the second video signal to equalize the characteristics of the first and second video signals based on the determination.

19. The method of claim 18, wherein the differences between the characteristics of the first and second video signals comprise differences in at least one of contrast, color, brightness, magnification, definition, and geometric distortion between the first and second video signals.

20. The method of claim 18, further comprising synthesizing the corrected first and second video signals and outputting a 3D video.

21. The method of claim 18, further comprising estimating a disparity between the first and second video signals using the corrected at least one of the first video signal and the second video signal and adjusting the estimated disparity.

22. The method of claim 18, wherein the correcting of the at least one of the first video signal and the second video signal comprises correcting the second video signal based on the characteristics of the first video signal or correcting the first video signal based on the characteristics of the second video signal, or correcting the first and second video signals based on an average of the characteristics of the first and second video signals to equalize the detected characteristics of the first and second video signals.

23. The method of claim 18, wherein the detecting of the differences comprises:
generating a histogram of contrast, which is one of the characteristics of the first and second video signals, for each frame of each of the first and second video signals; and
detecting a contrast difference between the first and second video signals based on distribution of the generated contrast histogram.

24. The method of claim 18, wherein the correcting of the at least one of the first video signal and the second video signal comprises correcting a bright portion of whichever of the first video signal or the second video signal has a lower contrast level, to become brighter, and correcting a dark portion of whichever of the first video signal or the second video signal has a higher contrast level, to become darker, to equalize contrast levels of the first and second video signals.

25. The method of claim 18, wherein the detecting of the differences comprises:
averaging respective values of brightness, which is one of the characteristics of the first and second video signals, for each frame of each of the first and second video signals; and
detecting a brightness difference between the first and second video signals using each of the calculated averages.

26. The method of claim 25, wherein the correcting of the at least one of the first video signal and the second video signal comprises equalizing brightness levels of the first and second video signals by raising an overall brightness level of whichever of the first or second video signal has a lower brightness level.

27. The method of claim 18, wherein the detecting of the differences comprises:
generating a histogram of color, which is one of the characteristics of the first and second video signals, for each frame of each of the first and second video signals; and
detecting a color difference between the first and second video signals based on the distribution of the generated color histogram.

28. The method of claim 18, wherein the correction of the at least one of the first video signal and the second video signal comprises, when a broadcasting signal comprising the first and second video signals is received, comparing test patterns of the first and second video signals included in the broadcasting signal and correcting the first and second video signals to equalize the test patterns thereof.

29. The method of claim 18, wherein the correcting of the at least one of the first video signal and the second video signal comprises:
generating test patterns of the first and second video signals; and
correcting the first and second video signals to equalize the generated test patterns of the first and second video signals.

30. The method of claim 18, wherein the correcting of the at least one of the first video signal and the second video signal further comprises:
receiving camera parameters for the characteristics of the first and second video signals at the time of a photographing operation; and
correcting the first and second video signals based on the camera parameters.

31. The method of claim 18, wherein the detecting of the difference comprises detecting the contrast difference between the first and second video signals, the determination of whether to correct the first and second video signals comprises comparing the contrast difference between the first and second video signals with a predetermined contrast difference threshold and determining whether the contrast difference is greater than the predetermined contrast difference threshold, and the correcting of the at least one of the first video signal and the second video signal comprises correcting the first or second video signal based on the determination result to equalize the contrast levels of the first and second video signals.

32. The method of claim 18, wherein the detecting of the difference comprises detecting the brightness difference between the first and second video signals, the determination of whether to correct the first and second video signals comprises comparing the brightness difference between the first and second video signals with a predetermined brightness difference threshold and determining whether the brightness difference is greater than the predetermined brightness difference threshold, and the correcting of the at least one of the first video signal and the second video signal comprises correcting the first or second video signal based on the determination result to equalize the brightness levels of the first and second video signals.

33. The method of claim 18, further comprising:
providing a user with a correction level indicating a range of correction level values; and
receiving the correction level values for the characteristics of video signals from the user,
wherein the correcting of the at least one of the first video signal and the second video signal comprises correcting the first and second video signals based on the correction level values received from the user.

34. The method of claim 33, wherein the providing of the correction level comprises providing the correction level in the form of characters and/or graphics.

35. A non-transitory computer-readable medium on which a program for executing the method of claim 18 is recorded.

* * * * *